(12) United States Patent
Suwa

(10) Patent No.: US 8,111,308 B2
(45) Date of Patent: Feb. 7, 2012

(54) SIGNAL PROCESSING APPARATUS, SIGNAL PROCESSING METHOD, AND IMAGE PICKUP APPARATUS

(75) Inventor: Takeshi Suwa, Kawasaki (JP)

(73) Assignee: Canon Kabushiki Kaisha (JP)

(*) Notice: Subject to any disclaimer, the term of this patent is extended or adjusted under 35 U.S.C. 154(b) by 188 days.

(21) Appl. No.: 12/572,576

(22) Filed: Oct. 2, 2009

(65) Prior Publication Data

US 2010/0085451 A1 Apr. 8, 2010

(30) Foreign Application Priority Data

Oct. 3, 2008 (JP) .................................. 2008-258959

(51) Int. Cl.
*H04N 9/64* (2006.01)
*H04N 5/217* (2011.01)
*G06K 9/40* (2006.01)

(52) U.S. Cl. ........ 348/248; 348/249; 348/243; 348/241; 348/607; 382/275; 382/274; 382/254

(58) Field of Classification Search .......... 348/241–251, 348/607, 615; 382/275, 274, 254
See application file for complete search history.

(56) References Cited

U.S. PATENT DOCUMENTS

| | | | | |
|---|---|---|---|---|
| 5,430,481 A | * | 7/1995 | Hynecek | 348/317 |
| 5,661,521 A | * | 8/1997 | Curtis et al. | 348/249 |
| 7,812,801 B2 | * | 10/2010 | Takane | 345/87 |
| 7,948,531 B2 | * | 5/2011 | Tanizoe et al. | 348/241 |

FOREIGN PATENT DOCUMENTS

| | | | |
|---|---|---|---|
| JP | 07-67038 A | | 3/1995 |
| JP | 2006-166368 A | | 6/2006 |
| JP | 2006166368 | * | 6/2006 |

* cited by examiner

*Primary Examiner* — Lin Ye
*Assistant Examiner* — Marly Camargo
(74) *Attorney, Agent, or Firm* — Rossi, Kimms & McDowell LLP

(57) ABSTRACT

A signal processing apparatus which is capable of performing a smear amount correction processing suitably according to change in the smear amount to suppress overcorrection of the smear amount. An output value of an image sensor and a smear amount on each of vertical lines of the image sensor are stored, respectively. An output signal value of an optical black portion on the image sensor stored in the first memory is compared with the smear amount stored in the second memory to determine a cyclic coefficient based on the comparison result. The smear amount is calculated based on the output signal value of the optical black portion on the image sensor stored in the first memory, the smear amount stored in the second memory, and the cyclic coefficient determined by the smear detection unit. A correction coefficient is calculated based on the smear amount determined by the smear amount calculating unit. The output signal value on an effective pixel portion of the image sensor stored in the first memory is subjected to a correction processing using the correction coefficient determined by the correction coefficient calculating unit.

12 Claims, 6 Drawing Sheets

FIG.3

|  | LARGE AMOUNT OF CHANGE IN SMEAR AMOUNT | SMALL AMOUNT OF CHANGE IN SMEAR AMOUNT | NO CHANGE IN SMEAR AMOUNT |
|---|---|---|---|
| INCREASE IN SMEAR AMOUNT | K1 | K2 | — |
| NO CHANGE IN SMEAR AMOUNT | — | — | K0 |
| DECREASE IN SMEAR AMOUNT | K3 | K4 | — |

FIG.6A *(PRIOR ART)*
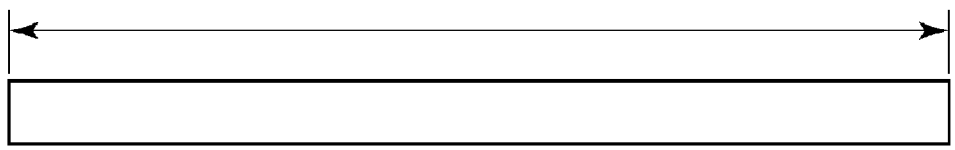
DETECTION VALUE ON FIRST FRAME = CORRECTION VALUE ON FIRST FRAME
FIG.6B *(PRIOR ART)*
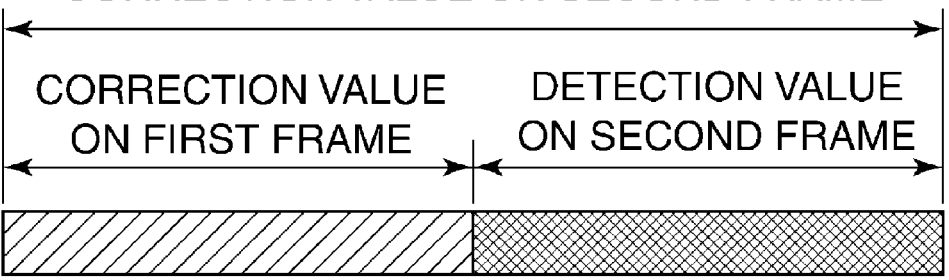
CORRECTION VALUE ON SECOND FRAME
CORRECTION VALUE ON FIRST FRAME | DETECTION VALUE ON SECOND FRAME
FIG.6C *(PRIOR ART)*
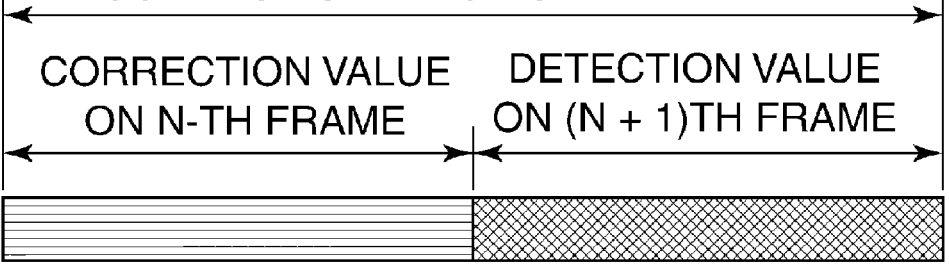
CORRECTION VALUE ON N-TH FRAME
CORRECTION VALUE ON N-TH FRAME | DETECTION VALUE ON (N + 1)TH FRAME

SIGNAL PROCESSING APPARATUS, SIGNAL PROCESSING METHOD, AND IMAGE PICKUP APPARATUS

BACKGROUND OF THE INVENTION

1. Field of the Invention

The present invention relates to a signal processing apparatus, a signal processing method, and an image pickup apparatus, and more particularly to a smear amount correction technique of correcting the smear phenomenon-relevant image degradation of an image sensor.

2. Description of the Related Art

Conventionally, a light receiving surface of an image sensor such as a CCD has been roughly divided into an optical black portion (hereinafter, referred to as "the OB portion") 4001 for shielding light not to be incident on a pixel and an effective pixel portion 4002 for receiving light as shown in FIG. 5. One of the reasons is for providing the OB portion 4001 to correct a dark current noise by subtracting the output the signal values of the OB portion 4001, i.e., the output signal values generated without light incident from the output signal values of the effective pixel portion 4002.

It is known that an image sensor such as a CCD generates a noise referred to as "smear" when a high-luminance object is in an angle of view thereof. When intense light enters the effective pixel portion 4002 of the image sensor, light leaking into a vertical transfer unit of an image sensor (not shown) is converted into an electric signal to highlight a signal on a vertical line. As a result, an image is colored in magenta on the vertical line of the vertical transfer unit into which the light leaks, and further, if light is large in quantity, the image may be subjected to clipped highlight.

In the image sensor, the determination of a difference between the output signal value of the OB portion (specifically, an OB-value reference portion 4003) disposed on a lower portion of the effective pixel portion 4002 and the output signal value on the same vertical line allows a smear amount to be corrected. If successive images are subjected to correction of the smear amount, a cyclic filtering processing is sometimes performed which refers to the smear amount on the previous frame as shown in FIGS. 6A to 6C.

If the cyclic filtering processing shown in FIGS. 6A to 6C is performed, its cyclic coefficient is generally controlled in consideration of the motion of an image. For example, if the image does not move, the cyclic coefficient is increased to thereby use also information of the OB-value reference portion 4003 of the previous frame, which reduces the influence of noises on the vertical line to enable the smear amount to be effectively corrected. For example, in the motion of an image is detected, the position of smear is also moved, so that information of the OB-value reference portion 4003 of the previous frame cannot be used. In this case, setting the cyclic coefficient to a small value allows the overcorrection to be reduced.

In the conventional smear amount correction, however, a plurality of OB lines is processed by a fixed cyclic coefficient, so that the results of image motion detection increases the weighting for the specific OB line, thereby increasing the influence of the noise (refer to Japanese Laid-Open Patent Publication (Kokai) No. H07-67038, for example). For this reason, there has been proposed a method of correcting the smear amount which is insusceptible to noises from the specific OB line independently of the results of the image motion detection. For example, there has been proposed a method of making it difficult to be insusceptible to the noises from the specific OB line by calculating the cyclic coefficient such that the weightings of the cyclic coefficients for the plurality of OB lines of the image sensor can be equal to one another (refer to Japanese Laid-Open Patent Publication (Kokai) No. 2006-166368, for example).

In the smear amount correction described in Japanese Laid-Open Patent Publication (Kokai) No. 2006-166368, the cyclic coefficients are calculated with attention drawn only to the absolute value of an amount of change in the smear amount, so that the cyclic coefficient is calculated as is in the case where the smear amount increases, even when the smear amount suddenly decreases. Therefore, the conventional smear amount correction processing makes it difficult to effectively suppress decrease in image quality due to the overcorrection made when the smear amount suddenly decreases. However, the smear amount overcorrected more than the originally generated smear looks worse to the user, which requires to suppress the overcorrection.

SUMMARY OF THE INVENTION

The present invention provides a signal processing apparatus, a signal processing method, and an image pickup apparatus, which are capable of performing a smear amount correction processing suitably according to change in the smear amount to suppress overcorrection of the smear amount.

In an aspect of the present invention, there is provided a signal processing apparatus comprising: a first memory adapted to store an output value of an image sensor; a second memory adapted to store a smear amount on each of vertical lines of the image sensor; a smear detection unit adapted to compare an output signal value of an optical black portion on the image sensor stored in the first memory with the smear amount stored in the second memory to determine a cyclic coefficient based on the comparison result; a smear amount calculating unit adapted to calculate the smear amount based on the output signal value of the optical black portion on the image sensor stored in the first memory, the smear amount stored in the second memory, and the cyclic coefficient determined by the smear detection unit; a correction coefficient calculating unit adapted to calculate a correction coefficient based on the smear amount determined by the smear amount calculating unit; and a correction unit adapted to subject the output signal value on an effective pixel portion of the image sensor stored in the first memory to a correction processing using the correction coefficient determined by the correction coefficient calculating unit.

The smear detection unit comprises a signal value comparing unit comparing the output signal value of the optical black portion on the image sensor stored in the first memory with the smear amount stored in the second memory, and a cyclic coefficient calculating unit determining a cyclic coefficient based on the output signal value of the optical black portion on the image sensor stored in the first memory, the smear amount stored in the second memory, and the comparison result obtained by the signal value comparing unit.

With this arrangement, it is possible to perform a smear amount correction processing suitably according to change in the smear amount and whether the smear amount changes in an increasing direction or in a decreasing direction to suppress the overcorrection of the smear amount exhibited when the smear amount suddenly decreases.

BRIEF DESCRIPTION OF THE DRAWINGS

FIG. 3 is a table which is useful in explaining cyclic coefficients that are used in the steps S2004 and S2005 in FIG. 2.

FIGS. 6A to 6C are views which are useful in explaining a cyclic processing that is performed when obtaining a smear amount by a conventional smear amount correction apparatus.

DETAILED DESCRIPTION OF THE PREFERRED EMBODIMENTS

The present invention will now be described in detail with reference to the drawings showing a preferred embodiment thereof.

Figure 1:
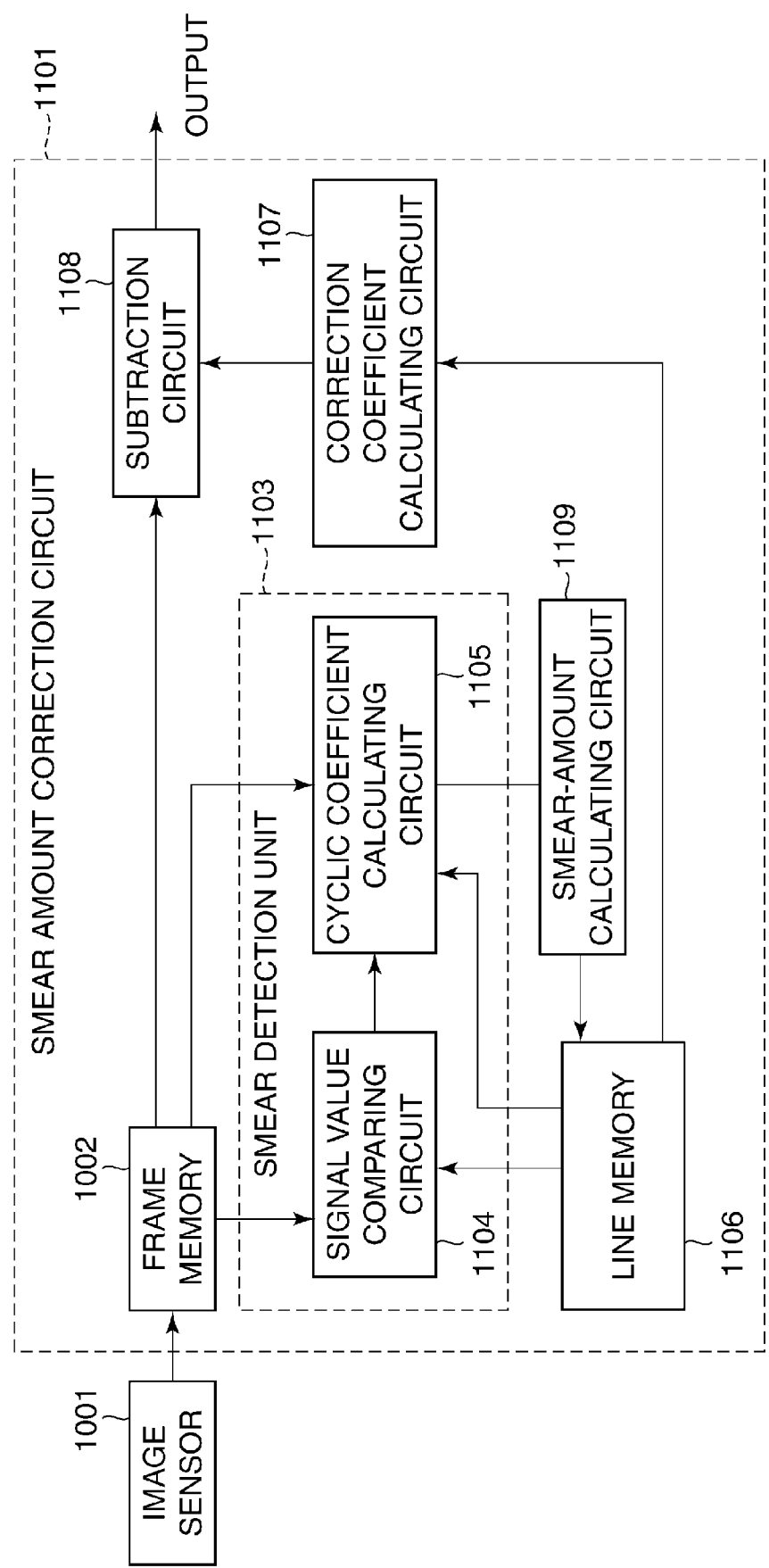
FIG. 1 is a block diagram schematically showing the configuration of an image pickup apparatus comprising a signal processing apparatus according to an embodiment of the present invention.

FIG. 1 is a block diagram schematically showing the configuration of an image pickup apparatus comprising a signal processing apparatus according to an embodiment of the present invention. The image pickup apparatus according to the present embodiment includes an image sensor 1001 such as CCD and a smear amount correction circuit 1101 as a signal processing apparatus. The image sensor 1001 converts incident light related to an object image into an electric signal and supplies its output to the smear amount correction circuit 1101.

The smear amount correction circuit 1101 performs a smear amount correction processing of FIG. 2, described later, that suppresses the degradation of image quality due to the smear phenomenon of the image sensor 1001. The smear amount correction circuit 1101 includes a frame memory (a first memory) 1002, a smear detection unit 1103, a line memory (a second memory) 1106, a correction coefficient calculating circuit 1107, a subtraction circuit (a correction circuit) 1108, and a smear amount calculating circuit 1109.

The frame memory (the first memory) 1002 is a memory for storing the output of the image sensor 1001 and stores one frame's output values of the image sensor 1001, for example. The line memory (the second memory) 1106 is a memory for storing the smear amount of each of vertical lines of the image sensor 1001 and stores one horizontal line's smear amount on one horizontal line of the image sensor 1001, for example.

The smear detection unit 1103 determines a cyclic coefficient according to the amount of change in the smear amount and the direction in which the smear changes (or whether the smear amount changes in an increasing direction and in a decreasing direction). The smear detection unit 1103 includes a signal value comparing circuit 1104 and a cyclic coefficient calculating circuit 1105.

The signal value comparing circuit 1104 compares the output signal value of the OB portion (optical black portion) 4001 (specifically, the OB-value reference portion 4003) on the current frame stored in the frame memory 1002 with the smear amount stored in the line memory 1106. Specifically, the output signal value comparing circuit 1104 compares the output signal value of the OB-value reference portion 4003 stored in the frame memory 1002 with the smear amount stored in the line memory 1106 to determine whether the smear amount changes in an increasing direction or in a decreasing direction. For example, the signal-value comparing circuit 1104 determines whether or not the signal value of the OB-value reference portion 4003 stored in the frame memory 1002 is smaller than the smear amount stored in the line memory 1106.

The cyclic coefficient calculating circuit 1105 determines a cyclic coefficient based on the output signal value of the OB-value reference portion 4003 on the current frame stored in the frame memory 1002, the smear amount stored in the line memory 1106, and the comparison result of the signal value comparing circuit 1104. In the present embodiment, the cyclic coefficient is determined in consideration of whether the output signal value of the OB-value reference portion 4003 stored in the frame memory 1002 in an increasing direction or in a decreasing direction with respect to the smear amount stored in the line memory 1106, in other words, the determination result of the signal-value comparing circuit 1104.

The smear amount calculating circuit 1109 calculates the smear amount based on the current frame-related output signal value of the OB-value reference portion 4003 stored in the frame memory 1002, the smear amount stored in the line memory 1106, and the calculation result at the cyclic coefficient calculating circuit 1105. The smear amount determined by the smear amount calculating circuit 1109 is written in the line memory 1106 as the smear amount of the current frame to update the smear amount stored in the line memory 1106 for every frame.

The correction coefficient calculating circuit 1107 calculates a smear amount correction-related correction coefficient based on the smear amount stored in the line memory 1106, specifically, the current frame-related smear amount determined by the smear-amount calculating circuit 1109. The subtraction circuit 1108 subjects one frame's data of the current frame stored in the frame memory 1002 to a subtraction processing (correction processing) based on the correction coefficient determined by the correction coefficient calculating circuit 1107 and then outputs the data (image) subjected to the smear amount correction.

A description will be given of an operation of the smear amount correction circuit 1101 in FIG. 1, with reference to FIG. 2. FIG. 2 is a flowchart showing the procedure of the smear amount correction processing that is performed by the smear correction circuit 1101 in FIG. 1.

Figure 2:
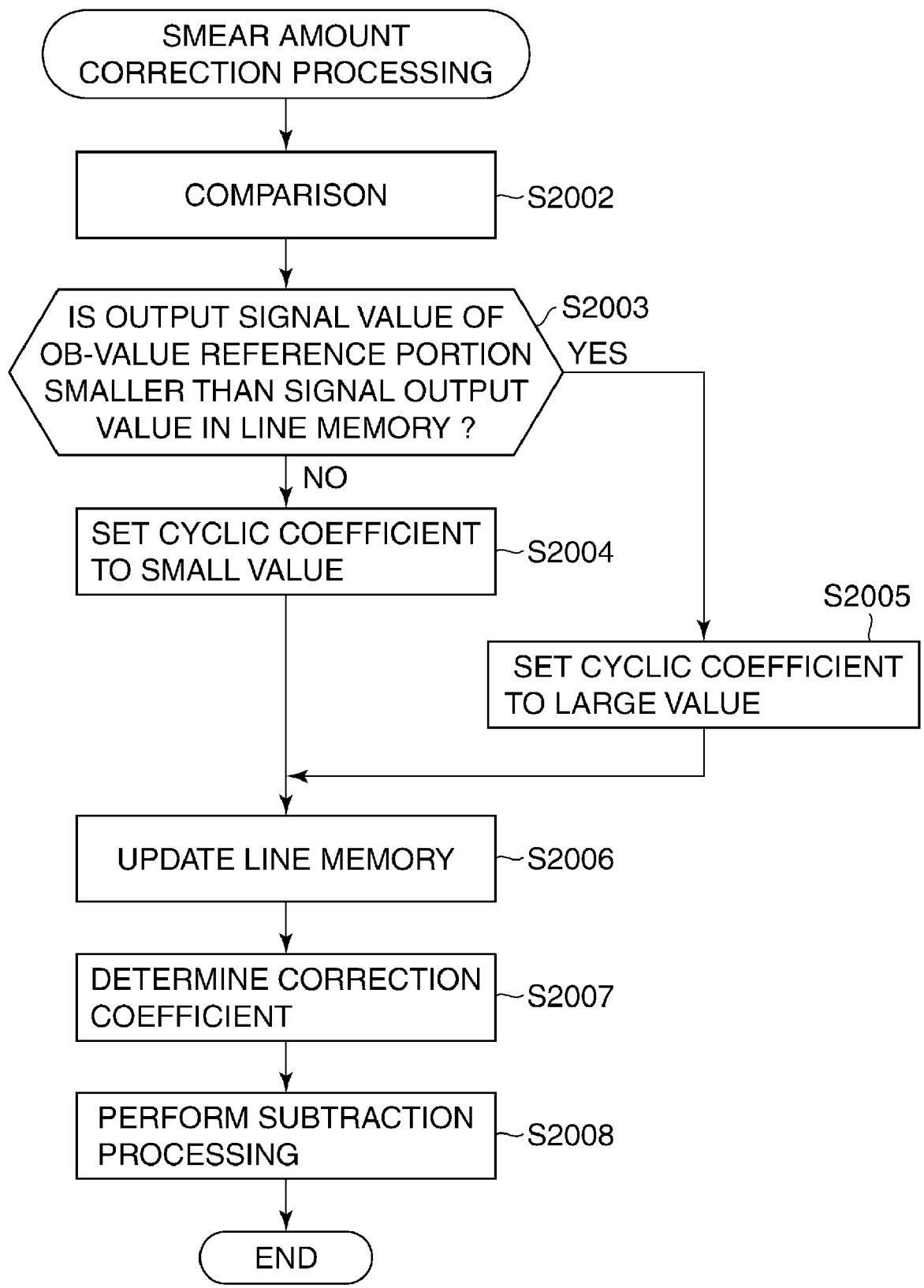
FIG. 2 is a flowchart showing the procedure of a smear amount correction processing that is performed by the smear amount correction circuit in FIG. 1.
Figure 5:
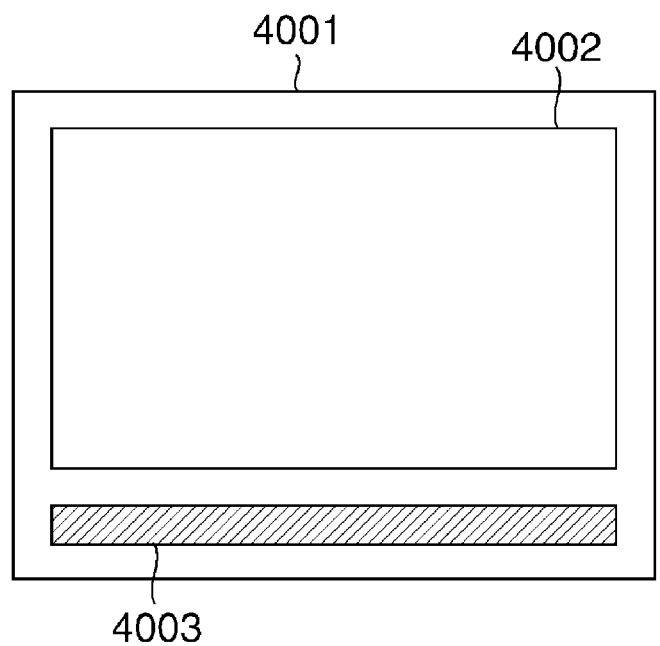
FIG. 5 is a view which is useful in explaining the light receiving surface of the image sensor in FIG. 1.

The smear amount correction circuit 1101 shown in FIG. 2 starts performing the smear amount correction processing when the output (signal) of the image sensor 1001 is supplied to the frame memory 1002. Information sent from the image sensor 1001 to the frame memory 1002 includes the respective output signal values of not only the effective pixel portion 4002 but also the OB portion 4001 (including the OB-value reference portion 4003) shown in FIG. 5.

In FIG. 2, the signal-value comparing circuit 1104 compares the current frame-related output signal value of the OB portion 4001 (specifically, the OB-value reference portion 4003) stored in the frame memory 1002 with the output signal value of the line memory 1106 that stores the previous frame's smear amount (step S2002), and then determines whether or not the current frame-related output signal value of the OB portion 4001 (specifically, the OB-value reference portion 4003) stored in the frame memory 1002 is less than the output signal value of the line memory 1106 that stores the previous frame's smear amount (step S2003). This determination is performed for each of the vertical lines of the image sensor 1001, i.e., for each of memories of the line memory 1106 corresponding to the addresses of the OB-value reference portion 4003. For this reason, the line memory 1106 needs to have a capacity to store one horizontal line's output signal values of the image sensor 1001 or needs to have a capacity to store 1000 columns' output signal values of the image sensor 1001 if the image sensor 1001 has 1000 vertical lines, for example.

It should be noted that the same processing is performed on each of all the columns irrespective of the number of columns, so that the following descriptions do not make any distinction according to which of the columns is selected. For example, the OB-value reference portion 4003 may be subjected to numerous sampling in the vertical direction with the sampling result arithmetically averaged in order to eliminate the influence due to random noise, which increases the detection accuracy.

As a result of the determination in the step S2003, when the output signal value of the OB-value reference portion 4003 is not less than the output signal value of the line memory 1106, the cyclic coefficient calculating circuit 1105 sets the cyclic coefficient K to a small value, whereas when the output signal value of the OB-value reference portion 4003 is less than the output signal value of the line memory 1106, the cyclic coefficient calculating circuit 1105 sets the cyclic coefficient K to a large value.

In this instance, the cyclic coefficient calculating circuit 1105 changes the cyclic coefficient K according to an amount of the image motion also. The larger the detected amount of the image motion, the smaller the cyclic coefficient K is set to be.

To sum up, the cyclic coefficient calculating circuit 1105 sets the cyclic coefficient K to a small value if the detected amount of change in the smear amount is large or to a large value if the detected amount of change in the smear amount is small. In addition, the cyclic coefficient calculating circuit 1105 sets the cyclic coefficient K to a small value if the smear amount decreases or to a large value if the smear amount increases. It should be noted that if the smear amount does not change, the output signal value of the OB-value reference portion 4003 is equal to the output signal value of the line memory 1106, so that, no matter what value the cyclic coefficient K is set to, the output result is not changed. However, it is desirable to set the cyclic coefficient K to a value larger than the value set when the detected amount of change in the smear amount is small.

With reference to FIG. 3, the cyclic coefficient K is referred to as "K0" if the smear amount does not change. The cyclic coefficient K is referred to as "K1" if the detected amount of change in the smear amount is large and the smear amount increases. The cyclic coefficient K is referred to as "K2" if the detected amount of change in the smear amount is small and the smear amount increases. The cyclic coefficient K is referred to as "K3" if the detected amount of change in the smear amount is large and the smear amount decreases. The cyclic coefficient K is referred to as "K4" if the detected amount of change in the smear amount is small and the smear amount decreases. In this case, the size relationship between the cyclic coefficients K can be expressed as below.

K0>K2>K1

K0>K4>K3

K0>K2>K4

K0>K1>K3

For example, as expressed by the relationship between K1 and K3 or between K2 and K4, the cyclic coefficient set when the smear amount decreases is set to a value smaller when the amount of change in the smear amount does not change than when the smear amount increases.

The smear amount calculating circuit 1109 calculates the smear amount on the current frame based on the cyclic coefficient K set by the cyclic coefficient calculating circuit 1105 using the output signal value of the OB-value reference portion 4003 stored in the frame memory 1002 and the output signal value of the line memory 1106. In this instance, if the output signal value of the OB-value reference portion 4003 is referred to as Sob, the output signal value of the line memory 1106 is referred to as Ssm, and the cyclic coefficient is referred to as K, the smear amount calculating circuit 1109 calculates the smear amount on the current 'frame Ssm' using the following equation (1).

$$Ssm' = Sob \times (1-K) + Ssm \times K \tag{1}$$

Then, in step S2006, the smear amount on the current frame calculated according to the equation (1) is written into the line memory 1106 to update the output signal value of the line memory 1106.

In step S2007, the correction coefficient calculating circuit 1107 determines a smear amount correction-related correction coefficient Csm with reference to the updated smear amount Ssm in the line memory 1106.

The correction coefficient Csm can be represented by the following equations (2) to (4).

(A) If Ssm≦S1 holds, $$Csm = 0 \tag{2}$$

(B) If S1<Ssm≦S2 holds, $$Csm = (S2/(S2-S1)) \times Ssm - (S1 \times S2/(S2-S1)) \tag{3}$$

(C) If S2<Ssm≦Smax holds, $$Csm = (S2/(S2-Smax)) \times Ssm - (S2 \times Smax/(S2-Smax)) \tag{4}$$

Figure 4:
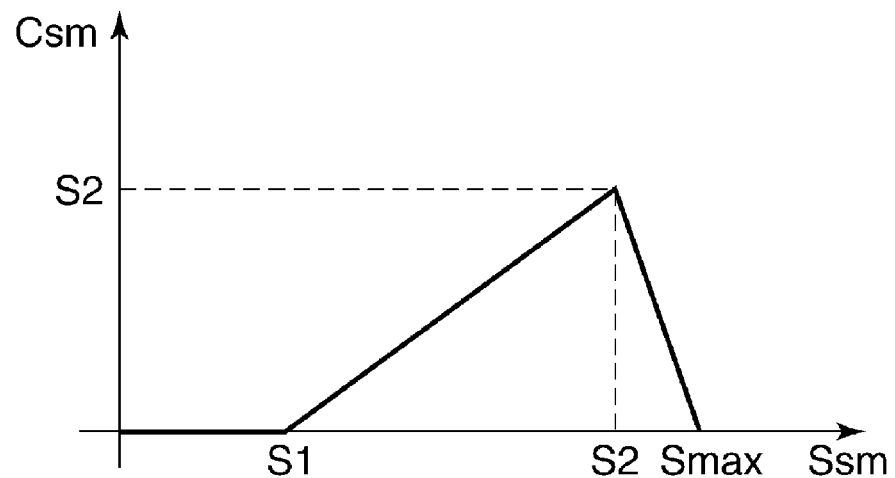
FIG. 4 is a graph which is useful in explaining the smear amount correction coefficient that is determined in the step S2007 in FIG. 2.

The correction coefficient Csm thus determined is shown in FIG. 4, in which the possible maximum value of the output signal value or the smear amount Ssm is referred to as "Smax".

The reason why the correction coefficient Csm is classified according to three cases of the output signal value Ssm is described below.

If the smear amount Ssm is small, it is desirable to perform no correction as represented by the equation (2). The complete correction may provide the overcorrection by corresponding amounts of random noises being superimposed, so that corresponding amounts of the smear being generated should be removed to some extent as represented by the equation (3). If the smear amount exceeds a certain value, it is desirable to perfect no correction as represented by the equation (4) because an increase of optical shot noises included in the smear requires a subtraction processing to thereby newly generate another noises source and because performing the subtraction processing when the smear amount is saturated provides the overcorrection.

In step S2008, the subtraction circuit 1108 performs the subtraction processing (correction processing) using the output signal value S of the effective pixel portion 4002 stored in the frame memory 1002 and the correction coefficient Csm determined by the correction coefficient calculating circuit 1107 to obtain the corrected output S'=S−Csm, thereby subjecting the output value of the image sensor 1001 to the smear correction processing.

According to the present embodiment, the signal value comparing circuit 1104 detects the amount of change in the smear amount and the direction in which the smear amount changes, i.e., whether the smear amount changes in an increasing direction or in a decreasing direction, based on the output signal value of the OB portion on the current frame and the smear amount on the previous frame, according to which result, the cyclic coefficient calculating circuit 1105 determines the cyclic coefficient to obtain the smear amount correction-related correction coefficient. This allows an appropriate smear amount correction according to the amount of change in the smear amount and whether the smear amount changes in an increasing direction or in a decreasing direction to enable effectively reducing and suppressing the overcorrection of the smear amount exhibited when the smear amount suddenly decreases.

In order to operate various kinds of devices for realizing functions of the signal processing apparatus according to the embodiment of the present invention, a computer (CPU or MPU) in an apparatus or a system connected to the various kinds of devices is supplied with a program of software which realizes the functions of the above described embodiment. The present invention includes those which are executed by operating the various kinds of devices according to the program stored in the computer of the system or the apparatus.

In this case, the program itself of the software realizes the functions of the embodiment described above, and hence the program itself constitutes the present invention. Further, a unit that supplies the program to the computer, for example, a storage medium having such a program stored therein constitutes the present invention. Examples of the storage medium for supplying the program include a floppy (registered trademark) disk, a hard disk, an optical disk, a magnetic-optical disk, a CD-ROM, a magnetic tape, a nonvolatile memory card, and a ROM.

It is to be understood that, also in a case where the functions of the above embodiment are accomplished in association with an operating system, an application software, or the like in which the supplied program operates on the computer, such a program is included in the embodiment of the present invention.

Moreover, the supplied program is stored in a memory disposed in an extension board or in an extension unit related to the computer, before the CPU or the like disposed in the extension board or the like performs a part or all of the actual processing based on instructions of the program. It is to be understood that a case in which the above processing realizes the functions of the above-mentioned embodiment is included in the present invention.

Figure 7:
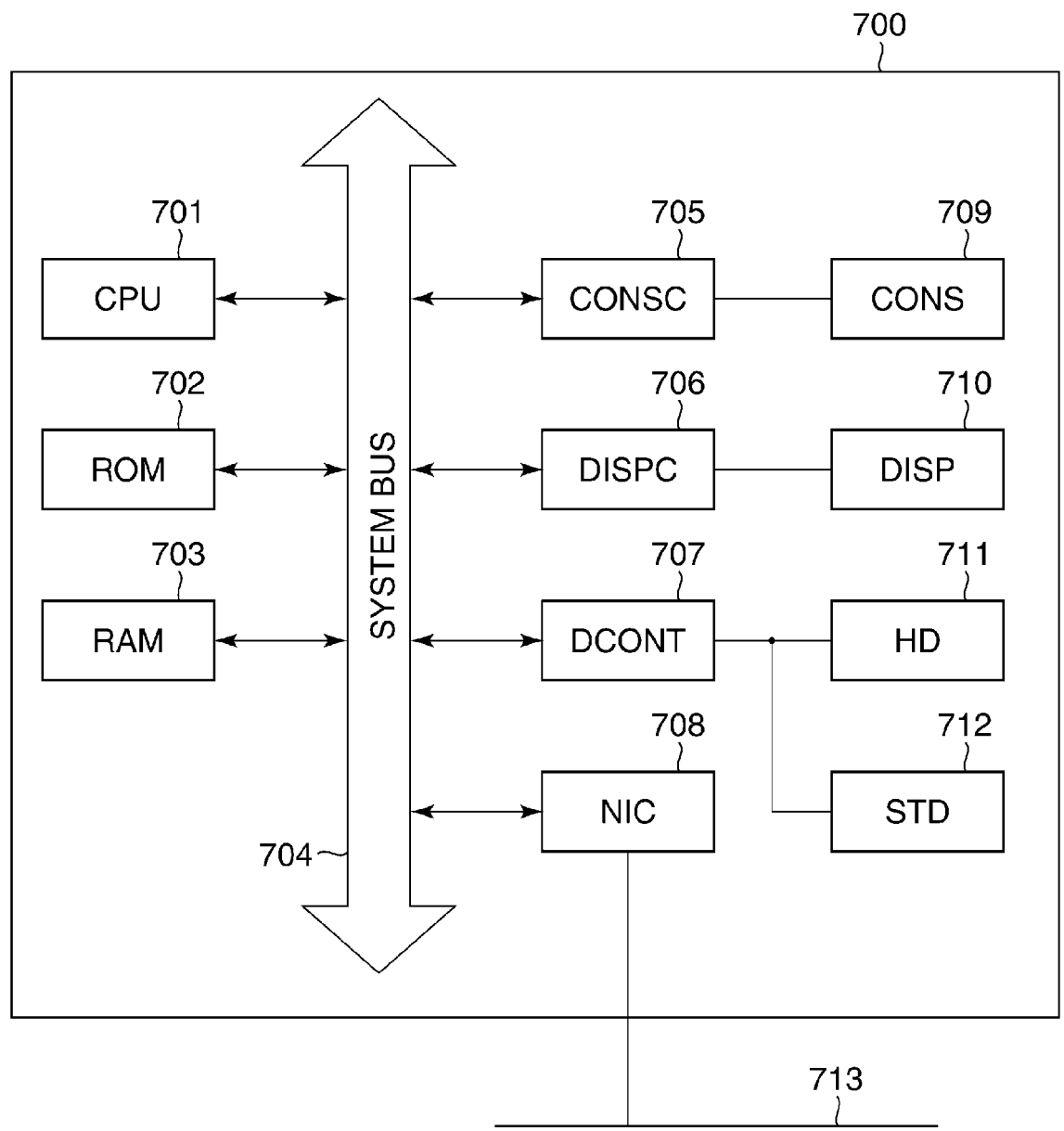
FIG. 7 is a block diagram which is useful in explaining a computer function capable of realizing a signal processing apparatus according to the embodiment of the present invention.

For example, the above-mentioned signal processing apparatus has a computer function 700 as shown in FIG. 7 and a CPU 701 therein executes the above-mentioned operations in the embodiment.

As shown in FIG. 7, the computer function 700 includes a CPU 701, a ROM 702, and a RAM 703. The computer function 700 further includes a controller (CONSC) 705 for an operating unit (CONS) 709 and a display controller (DISPC) 706 for a display (DISP) 710 as a display unit such as a CRT and an LCD. The computer function 700 still further includes a controller (DCONT) 707 for a hard disk (HD) 711 and a storage device (STD) 712 such as a flexible disk, and a network interface card (NIC) 708. The function units 701, 702, 703, 705, 706, 707, and 708 are communicably connected to one another through a system bus 704.

The CPU 701 executes the software stored in the ROM 702 or the HD 711 or the software supplied from the STD 712 to generally control the function units connected to the system bus 704. The CPU 701 reads out processing programs for carrying out the above operations from the ROM 702, the HD 711, or the STD 712 and executes the programs to take control to realize the operations described in the above embodiment. The RAM 703 serves as a main memory, a work area or the like for the CPU 701.

The CONSC 705 controls inputting of instructions from the CONS 709. The DISPC 706 controls displaying of the DISP 710. The DCONT 707 controls accessing to the HD 711 and the STD 712 storing a boot program, various kinds of applications, a user file, a network management program, and the processing program in the above-mentioned embodiment. The NIC 708 bilaterally exchanges data with the other apparatuses on the network 713.

Is should be noted that the above embodiment merely shows an example for carrying out the present invention and hence this should not be construed as limiting the technical scope of the present invention. In other words, the present invention can be implemented in various kinds of forms without departing from its technical idea or its primary characteristics.

This application claims priority from Japanese Patent Application No. 2008-258959 filed Oct. 3, 2008, which is hereby incorporated by reference herein in its entirety.

What is claimed is:

1. A signal processing apparatus comprising:
   a first memory adapted to store an output value of an image sensor;
   a second memory adapted to store a smear amount on each of vertical lines of the image sensor;
   a smear detection unit adapted to compare an output signal value of an optical black portion on the image sensor stored in said first memory with the smear amount stored in said second memory to determine a cyclic coefficient based on the comparison result;
   a smear amount calculating unit adapted to calculate the smear amount based on the output signal value of the optical black portion on the image sensor stored in said first memory, the smear amount stored in said second memory, and the cyclic coefficient determined by said smear detection unit;
   a correction coefficient calculating unit adapted to calculate a correction coefficient based on the smear amount determined by said smear amount calculating unit; and
   a correction unit adapted to subject the output signal value on an effective pixel portion of the image sensor stored in said first memory to a correction processing using the correction coefficient determined by said correction coefficient calculating unit.

2. The signal processing apparatus according to claim 1, wherein said smear detection unit comprises a signal value comparing unit adapted to compare the output signal value of the optical black portion on the image sensor stored in said first memory with the smear amount stored in said second memory, and a cyclic coefficient calculating unit adapted to determine a cyclic coefficient based on the output signal value of the optical black portion on the image sensor stored in said first memory, the smear amount stored in the second memory, and the comparison result obtained by said signal value comparing unit.

3. The signal processing apparatus according to claim 2, wherein said signal value comparing unit determines whether the smear amount changes in an increasing direction or in a decreasing direction based on the comparison result.

4. The signal processing apparatus according to claim 3, wherein said signal value comparing unit determines an amount of change in the smear amount based on the comparison result.

5. The signal processing apparatus according to claim 4, wherein the cyclic coefficient calculating unit determines the cyclic coefficient according to the amount of change in the smear amount and whether the smear amount changes in the increasing direction or in the decreasing direction.

6. The signal processing apparatus according to claim 5, wherein the cyclic coefficient calculating unit sets the cyclic coefficient to a small value when the smear amount decreases, and sets the cyclic coefficient to a large value when the smear amount increases.

7. The signal processing apparatus according to claim 5, wherein the cyclic coefficient calculating unit sets the cyclic coefficient to a small value when the amount of change of the smear amount is large, and sets the cyclic coefficient to a large value when the amount of change of the smear amount is small.

8. The signal processing apparatus according to claim 1, wherein, said smear detection unit sets the cyclic coefficient smaller when the output signal value of the optical black portion on the image sensor stored in said first memory decreases with respect to the smear amount stored in said second memory than when the output signal value in said first memory increases with respect to the smear amount in said second memory, in a case where an amount of change of the output signal value in said first memory does not change.

9. The signal processing apparatus according to claim 1, wherein the smear amount stored in said second memory is updated by the smear amount determined by said smear amount calculating unit for every frame.

10. The signal processing apparatus according to claim 1, wherein said first memory comprising a frame memory that stores at least one frame's output value of the image sensor, and said second memory comprises a line memory that stores a horizontal line's smear amount of the image sensor.

11. An imaging apparatus comprising:
an image sensor adapted to convert incident light related to an object image into an electrical signal;
a first memory adapted to store an output value of said image sensor;
a second memory adapted to store a smear amount on each of vertical lines of the image sensor;
a smear detection unit adapted to compare an output signal value of an optical black portion on the image sensor stored in said first memory with the smear amount stored in said second memory to determine a cyclic coefficient based on the comparison result;
a smear amount calculating unit adapted to calculate the smear amount based on the output signal value of the optical black portion on the image sensor stored in said first memory, the smear amount stored in said second memory, and the cyclic coefficient determined by said smear detection unit;
a correction coefficient calculating unit adapted to calculate a correction coefficient based on the smear amount determined by said smear amount calculating unit; and
a correction unit adapted to subject the output signal value on an effective pixel portion of the image sensor stored in said first memory to a correction processing using the correction coefficient determined by said correction coefficient calculating unit.

12. A signal processing method comprising the steps of:
storing an output value of an image sensor in a first memory;
storing a smear amount on each of vertical lines of the image sensor in a second memory;
comparing an output signal value of an optical black portion on the image sensor stored in said first memory with the smear amount stored in said second memory to determine a cyclic coefficient based on the comparison result;
calculating the smear amount based on the output signal value of the optical black portion on the image sensor stored in said first memory, the smear amount stored in said second memory, and the cyclic coefficient determined at said smear detection step;
calculating a correction coefficient based on the smear amount determined at said smear amount calculating step; and
subjecting the output signal value on an effective pixel portion of the image sensor stored in said first memory to a correction processing using the correction coefficient determined at said correction coefficient calculating step.

* * * * *